March 13, 1956 — W. E. BUCKLEY — 2,737,961
APPARATUS AND METHOD FOR SUPPLYING AN
ACCURATELY MEASURED SUPPLY OF FLUID
Filed Nov. 16, 1950 — 4 Sheets-Sheet 1

FIG. I.

INVENTOR.
WILLIAM E. BUCKLEY
BY Mack & Blum
ATTORNEYS.

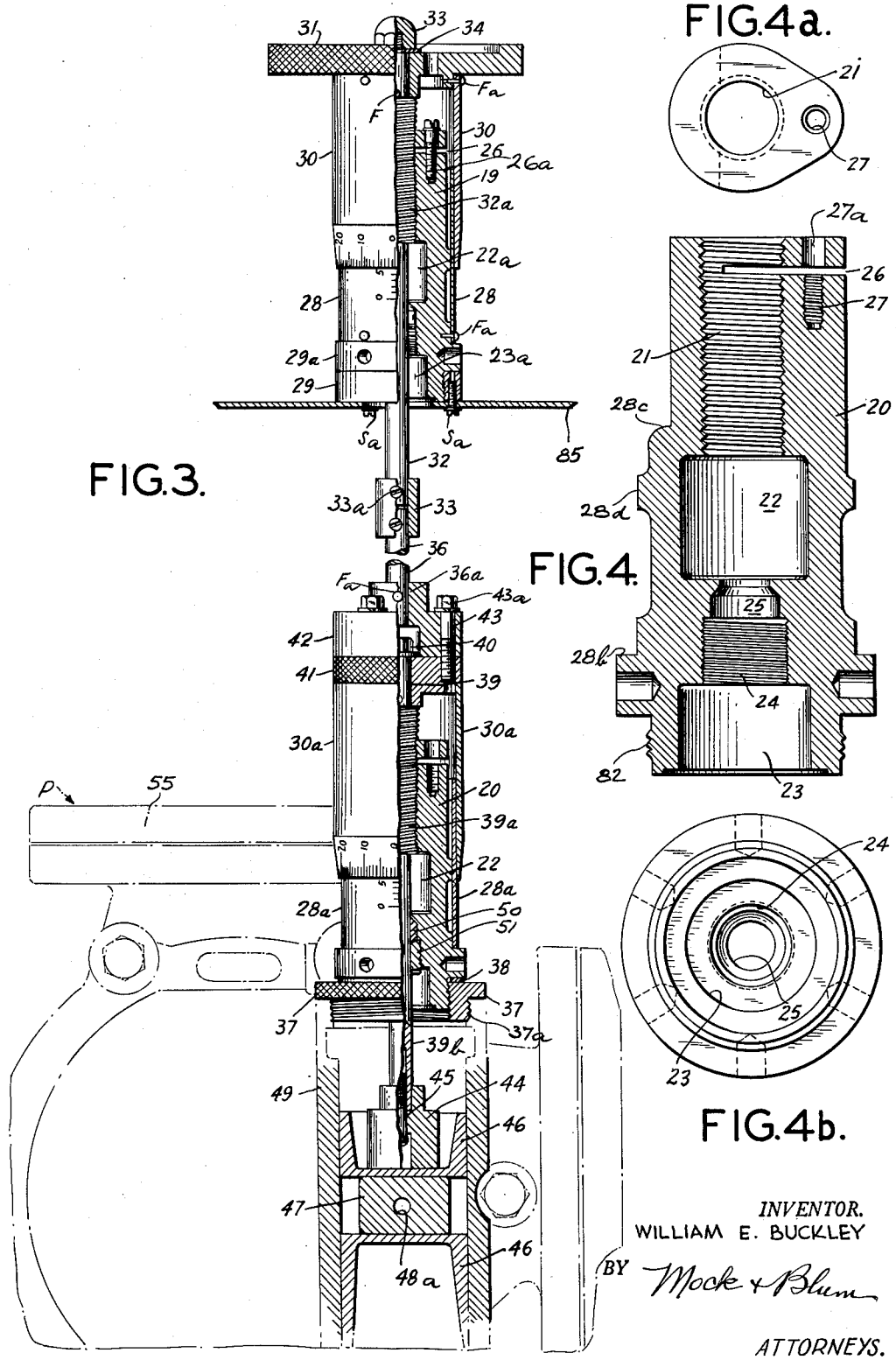

March 13, 1956

W. E. BUCKLEY 2,737,961

APPARATUS AND METHOD FOR SUPPLYING AN
ACCURATELY MEASURED SUPPLY OF FLUID

Filed Nov. 16, 1950

INVENTOR.
WILLIAM E. BUCKLEY

BY Mock & Blum

ATTORNEYS.

United States Patent Office 2,737,961
Patented Mar. 13, 1956

2,737,961

APPARATUS AND METHOD FOR SUPPLYING AN ACCURATELY MEASURED SUPPLY OF FLUID

William E. Buckley, Huntington, N. Y., assignor to The Cornell Machine Company, New York, N. Y., a corporation of Ohio Application November 16, 1950, Serial No. 195,965

6 Claims. (Cl. 137—7)

My invention relates to new and improved apparatus and a new and improved method for continuously supplying an accurately measured supply of liquid or of a gas or vapor, or accurately measured supplies of different respective liquids or gases or vapors. The liquid or liquids or gas or gases or vapor or vapors may be of any type or kind.

Without limiting the invention thereto, the improved apparatus and method are especially suitable for continuously delivering accurately metered amounts of fluids such as respective petroleum fractions from respective different tanks or other sources to a common outlet, which may be a common manifold which leads to the inlet valve of a homogenizer which is maintained at a lower pressure than said manifold. Continuous large scale operation is possible, with an accuracy as high as 0.1%, in the supply of each fluid and in the volume of the final mixture.

It is of course well known to deliver a liquid from a tank or other source to a meter, and to pass said liquid through the meter. In such case the liquid must have a higher pressure at the inlet of the meter than at its outlet.

In such case, the flowing liquid operates the meter. Experience has shown that this old system can not produce the high accuracy of the improved system, especially when a substantial pressure head is applied to the meter by the flowing liquid.

It has also been proposed to use an adjustable rotary pump for delivering liquid at a selected rate, when said pump is rotated at constant selected speed, but systems of this old type can not deliver liquid with the great accuracy of the new system.

According to the new system, I use one or more supply or metering units. Each unit comprises a pump which takes in the respective liquid from a tank or other source. This pump is designated as the anterior pump or booster pump. This booster pump of each supply or metering unit delivers the liquid to a second pump of the same unit, said second pump being designated as the proportioning pump or the metering pump. Each said metering pump is power-driven by a motor at constant respective selected velocity and the booster pump of each unit is preferably motor-driven independently of the metering pump of said unit.

When several fluid ingredients of a fluid mixture are delivered by respective supply units, the output of each unit is selected and kept constant during the continuous making of the respective mixture so that the ingredients are delivered continuously in the selected percentages. In each supply unit, the booster pump is operated so as to deliver more than the selected volume supply of the respective ingredient, if the metering pump were omitted. The output of each unit is selected and controlled by controlling its metering pump. This is done either by regulating the velocity of the metering pump, or by regulating the output of the metering pump per stroke or revolution, or by regulating both the velocity and the output per stroke or revolution.

Thus, as one simple example, it is assumed that three petroleum fractions are to be supplied and mixed by respective first, second and third supply units in the proportions of 45% and 45% and 10% by volume. As one illustrative working figure, the total output of the three units is 100 gallons per minute of the final desired mixture or throughput of the entire system.

In such case, the booster pumps of the first and second units are operated and adjusted so as to deliver more than 45 gallons per minute if the metering pumps of these units were removed. In such case, each said booster pump may deliver at the rate of substantially 90 gallons per minute. The adjustment and velocity of the metering pump of each said unit are selected so as to pass only 45 gallons per minute, and the standard and well-known pressure control of each booster pump is adjusted to apply a pressure of substantially twenty pounds per square inch between the outlet of the booster pump and the inlet of the associated metering pump.

As later more fully stated, the pressure which is thus applied at the inlet end of each metering pump of the three-unit system by the respective booster pump, is adjusted to be continously equal to the pressure at the outlet end of each metering pump and the pressure in the common discharge manifold of the three units, which leads to the homogenizer.

Likewise, the booster pump of the third unit is adjusted to deliver more than ten gallons per minute if the metering pump is omitted, and the metering pump is operated and adjusted to pass only ten gallons per minute. The pressure which is applied to the metering pump of the third unit by its booster pump is adjusted to the corresponding pressure between the booster pumps and metering pumps of the other units. Hence each unit operates at the same pressure at the inlet end of each metering pump, and said pressure equals the pressure at the outlet end of each metering pump and in the common outlet line of all the units.

In practice, the system preferably includes a plurality of units, in order to deliver two or more respective fluids in a constant proportion which is selected for the respective run.

Zero difference of pressure, or substantially zero difference of pressure, is thus maintained through each metering pump, between the inlet end of each metering pump and its outlet end. The metering pump is motor driven and adjusted or calibrated so as to pass through the respective liquid or fluid at the respective desired rate, when said adjusted metering pump is motor-operated at the selected constant velocity for the respective run.

If the system includes a plurality of such units, the above disclosure applies to each unit.

In general, and without limitation to the numerous additional features disclosed herein, the invention generally covers each and every system wherein a metering pump is motor-driven to pass through or deliver liquid at a constant selected rate when said metering pump is actuated at corresponding respective relative speed, and there is zero difference or substantially zero difference of pressure between the inlet and outlet of said metering pump, so that the liquid which flows through the pump does not supply power for operating the metering pump.

While the invention is not limited to any type of pump or to the use of a booster pump, I greatly prefer to use units, each of which includes a booster pump and a metering pump, and I also prefer to use the same type of pump for the booster pump and the metering pump. This type of pump is well known as the "Tri-Rotor" pump and it is made by The Yale & Towne Co. of Stamford, Connecticut, and it is described in numerous booklets of said manufacturer. The booster pump is used without any change, and the metering pump is modified as later explained herein.

This type of pump is described in the following United States patents:

| No.: | Date |
| --- | --- |
| 2,018,692 | Oct. 29, 1935 |
| 2,018,693 | Oct. 29, 1935 |
| 2,247,922 | July 1, 1941 |
| 2,348,679 | May 9, 1944 |

These patents also disclose alternative pumps which I can use.

The unmodified booster pump or pumps are driven at constant selected speed, and the modified metering pump or pumps are also driven at constant selected speed. The booster pump or pumps and the metering pump or pumps are driven either at the same speed, or at different respective constant speeds. The metering pump of each unit is calibrated or adjusted to deliver the liquid at the respective selected rate, when said metering pump is driven at the respective selected constant speed. The output line of each metering pump is regulated by a conventional pressure regulator as of the relief-valve type, so that the constant or substantially constant pressure which is produced by the respective booster pump at the inlet port of the associated metering pump, is equal or substantially equal to the constant or substantially constant pressure at the output port of said metering pump.

As one example to which the invention is not limited, the equal pressure which is maintained at the inlet and outlet ports of each metering pump may be in the range of 20–25 pounds per square inch.

Another advantage of the invention is that it minimizes the loss of liquid, when there is a change of the liquid which is being delivered through one or more units.

Numerous other objects and advantages and features of this invention are set forth in the annexed description and drawings, which disclose a preferred embodiment of the apparatus.

Fig. 3 is a section on the line 3—3 of Fig. 1, showing the means for adjusting the output of a metering pump so that said output can be adjusted without changing the speed of rotation of said metering pump.

Fig. 4 is an enlarged detail sectional view of the casing of one of the vernier adjustments;

Fig. 4a is a top plan view of Fig. 4;

Fig. 4b is a bottom plan view of Fig. 4; and

The apparatus preferably includes a plurality of supply or pumping units which may range in number from two pumping units up to as many as two hundred pumping units or more. Each pumping unit has the inlet side of its booster pump connected to a respective different source of liquid. The metering pumps of said units have their outlet ports connected to a common outlet manifold. Each said metering pump has its own delicate vernier adjustment for regulating the volume of its output per unit of time, while said metering pump is rotated by a motor at constant selected velocity.

The type of pump which is designated as "Tri-Rotor" No. 100 CV delivers 100 gallons of liquid per minute, when operated at 690 revolutions per minute. This type of pump is used as a booster pump, without any change. The same type of pump, modified as later described, is used as a metering pump in each unit which has this booster pump.

As one example, a commercial apparatus has six metering units.

These six metering units are divided into two sets, each set having three supply or metering units.

This illustrative system has three identical large-capacity supply units and three identical small-capacity supply units.

In each of the three large-capacity units, the booster pump is well-known in the trade and described in said booklets as No. 100 CV, without modification, and the metering pump is No. 100 CV, modified as later described. In each said large-capacity unit, the booster pump is operated at 680 revolutions per minute. Each said booster pump would thus deliver substantially 98 gallons per minute, if the metering pump were omitted. Each metering pump is operated at 640 revolutions per minute, and it is adjusted to deliver or pass through substantially 3% to 95% of the total throughput or total mixture.

In each of the three small-capacity units, each booster pump is No. 20 DV, well-known and described in said printed booklets, and it is operated at 842 revolutions per minute to deliver 15 gallons to 16 gallons per minute, if the metering pumps are omitted. The three metering pump are modified No. 20 DV pumps, and each is adjusted to pass through or deliver substantially zero per cent to 14% of the total throughput or total mixture.

By providing equal and constant pressure at the inlet and outlet of each metering pump and also in said metering pump between its inlet and outlet, I prevent the by-passing of liquid through the metering pump without metering action, so that the measured output of each supply unit is accurately selected by the calibration or adjustment of the metering pump.

*The metering pump*

Figure 5:
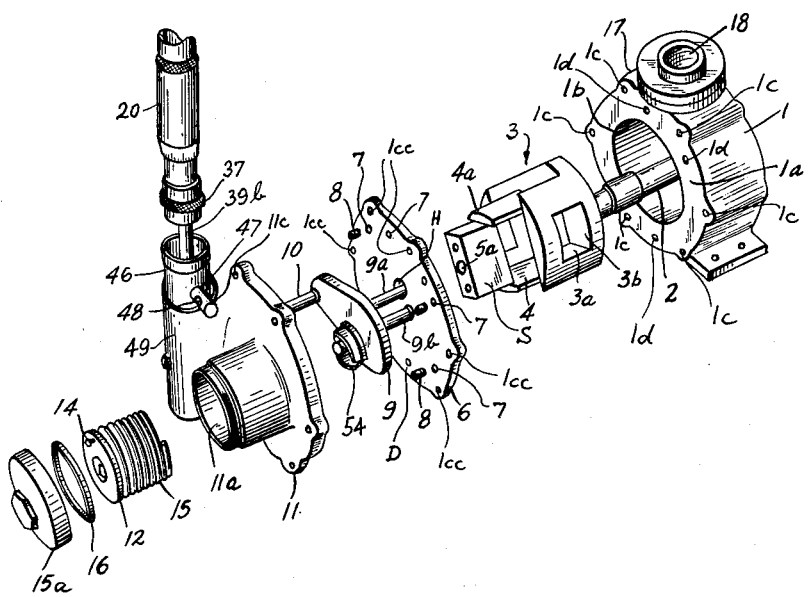
Fig. 5 is an exploded view which shows certain important parts of the Yale and Towne pump which is designated as "Tri-Rotor" No. 100 CV in the instruction manual revised and published by The Yale and Towne Mfg. Co.

Fig. 5 shows the usual pump body or casing 1, which has a longitudinal outer face 17, and a cylindrical inner longitudinal face 1b. The usual rotor 3 is fixed to the usual longitudinal rotor shaft 2. Said rotor shaft 2 and said cylindrical face 1b have a common longitudinal axis. The rotor 3 has the usual ports 3a. These ports 3a are transversely diametrically opposed relative to the axis of shaft 2. Only one of these ports is shown in Fig. 5. This rotor 3 has the usual longitudinal recess or slot, which extends up to the front wall of said rotor. The rotor 3 has the usual imperforate transverse rear wall 3b. The usual channel-shaped piston, which has longitudinal walls 4a and 4, is transversely slidable in said longitudinal slot of rotor 3, in a direction perpendicular to the axis of shaft 2. This channel-shaped piston is closed at its rear end, where the longitudinal walls 4a and 4 are connected by a rear imperforate transverse wall, which slidingly abuts wall 3b of the rotor 3.

The usual shuttle S fits between the piston walls 4a and 4 and said shuttle S is slidable transversely relative to said channel-shaped piston in order to exert the usual pumping action. The shuttle S has a front wall which has a median longitudinal recess 5a.

When these parts are assembled, the outer periphery of the rotor 3 fits against the inner face 1b, save where said outer periphery of rotor 3 is interrupted by the openings of its two ports and by its front longitudinal recess. The piston and shuttle are then wholly located in the pump body or casing. When the parts are assembled, the shuttle S is slidably mounted between the walls 4 and 4a, and said shuttle S is movable relative to rotor 3 in a direction perpendicular to the axis of shaft 2.

The casing 1 has the usual discharge port 18 and it also has the usual inlet port, which is not shown. In some models of this type of pump, the inlet port and the outlet or discharge port have a common axis. In other models of this type of pump, the inlet port and the discharge port 18 have different respective axes, which may be in the same plane and perpendicular to each other.

Fig. 5 shows the usual plate 6, which is used as a pressure control plate in the unmodified booster pump. This plate 6 has six holes 1cc, which register with the six recesses 1c of the front face 1a of casing 1. Bolts or other fastening members are extended through openings 1cc into recesses 1c, in order to clamp plate 6 against the planar front face 1a of casing 1. Plate 6 has front and rear planar and parallel faces.

The front face 1a of casing 1 has four additional recesses 1d, which register with holes D of plate 6. Dowels are passed through holes D into recesses 1d, in order to ensure proper assembly.

The standard pressure control plate 6 in said unmodified pump has four ports 7, through which liquid can pass from casing 1 to a pressure control, which automatically stops the pumping action when the pressure in the discharge line of the unmodified pump exceeds a selected outlet pressure, thus maintaining a constant outlet pressure of the booster pump. When the pump is modified to be used as a metering pump, said pressure control is not used, and the ports or holes 7 of pressure control plate 6 are closed by plugs 8.

The usual control arm or lever 9 is pivoted to plate 6 by a pivot pin 9b. The usual rod 9a extends through the usual hole H of plate 6. This hole H is of greater diameter than rod 9a. When the parts are assembled, the rod 9a extends into the recess 5a of shuttle S in the usual manner.

By turning control lever 9 about the axis of its pivot pin 9b, the rod 9a and shuttle S can be adjusted, so that the common axis of rod 9a and of recess 5a, which is the longitudinal median axis of shuttle S, is either coincident with the axis of shaft 2, or offset transversely from the axis of shaft 2. When these axes are thus coincident, the pump rotates idly, without discharging any liquid. When these axes are relatively offset, liquid is discharged at a rate which depends upon the amount of offset and the velocity of rotation. The two openings 3a in the side of the rotor 3 operate as ports. In this type of pump, there are four pumping or discharge strokes for each revolution of the rotor 3. The hole H is sufficiently large to permit the turning of control lever 9 through the desired angle of adjustment.

The usual pin or rod 10 extends longitudinally and forwardly from control lever 9.

The usual gasket head or cover 11 has a recess in its rear face. Said head or cover 11 is fixed in the usual manner to pump casing 1 by bolts or other fastening members which extend through holes 11c of head 11 and respective alined holes 1cc, to enter respective recesses 1c. The head 11 has the usual cylindrical guide 49, and the usual longitudinal shell 11a.

The usual cylindrical plunger 46 is slidably guided in the guide 49. This plunger 46 has the usual cross-pin or cross-head 47, which has a longitudinal hole 48.

When the parts are assembled, the cross-head 47 is located in the well-known manner within the plunger 46, and its hole 48 is longitudinal and the longitudinal rod or pin 10 extends turnably through the hole 48 and longitudinally alined openings of the plunger 46, all of which is well-known.

The lever 9 has the usual plate 54. The usual helical control spring 15, which acts as a torsion spring, extends through the shell 11a of head 11 when the parts are assembled. When thus assembled, the inner hook-end of control spring 15 catches in the recess of plate 54.

Spring cap 15a and gasket 16 are assembled with shell 11a in the usual manner.

In the conventional pump of this type, the control spring 15 holds the plunger 46 and the pin or rod 9a in the selected position, in which the pump operates at maximum capacity.

The disc 12 is fixed to the front end of spring 15 in the usual manner. By turning disc 12, the torsion of control spring 15 can be regulated. When disc 12 has been turned to selected position, it is releasably locked to shell 11a by pin 14 in the usual manner. If the discharge line of the unmodified booster pump is closed, the pressure of the liquid actuates the plunger 46 in the unmodified booster pump, so as to turn lever 9 to a position in which the pumping action is zero.

The lower body 20 of the new and improved control for each metering pump is identical with an upper body 19. As shown in Fig. 4, this lower body 20 has a longitudinal passage 21 which is internally threaded. At its bottom end, this passage 21 has an enlargement 22 which has a smooth cylindrical wall. The lower end of the body 20 is provided with a longitudinal opening or recess 23 which has a smooth cylindrical wall. This recess 23 communicates with a cylindrical passage 24 which is also internally threaded and which is of smaller diameter than recess 23 and passage 22. This reduced passage 24 communicates through a passage 25 with the passage 22. A continuous opening is therefore provided between the top and bottom of the body 20.

As shown in Fig. 4, the body 20 is also provided at one end thereof with a lateral slot or recess 26 which extends into the threaded passage 21. Communicating with this lateral slot 26, there is a longitudinal and internally threaded recess 27 of body 20, which is alined with a longitudinal bore 27a of body 20. An outer sleeve 30a is mounted turnably on the intermediate sleeve 28a.

Said intermediate sleeve 28a is fixed by any suitable fastening means to the lower part of the body 20. Said outer sleeve 30a is fixed to the hand wheel 41 so that hand wheel 41 and outer sleeve 30a turn in unison. The intermediate sleeve 28a extends from the flange 28b of the body 20 up to the flange 28c of said body 20. The lower part of the outer sleeve 30 turnably fits against and overlaps the upper part of the intermediate sleeve 28a and parts of a vernier scale are provided at these overlapping parts.

The rod 39 has an externally threaded portion 39a, which engages the thread of the upper passage 21 of the body 20. An extension 39b of rod 39, which does not have an external thread, extends below the bottom recess 23 of the body 20. The bottom end-part of the extension 39b is internally threaded. A tip 44 is turnably connected to the extension 39b by means of a bearing screw 45 which is fixed by means of an external thread to the internal thread at the bottom recess of the extension 39b. The tip 44 may optionally have a slight and limited up-and-down movement relative to the member 39b. The upper end of the rod 39 is externally threaded so that a nut 40 provides an assembly between the rod 39 and the knurled hand wheel 41. A coupling collar 42 is connected to hand wheel 41 by means of a standard pin 43. This pin 43 extends through a longitudinal bore of the coupling collar 42 and said pin 43 has an externally threaded end which engages an internally threaded recess of the hand wheel 41. The usual head 43a is provided on the pin 43.

The assembly between the sleeve 30a and the hand wheel 41 is maintained by means of lateral pins, like the pins Fa, which extend through openings of the sleeve 30a into a flange of the hand wheel 41. Any suitable form of assembly may be used.

The top hand wheel 31 is fixed to an outer sleeve 30 by means of pins Fa which extend laterally through the upper and outer sleeve 30 and into a flange of the upper hand wheel 31. This is similar to the connection between the lower hand wheel 41 and the lower sleeve 30a.

The upper half of the assembly of Fig. 3 has a rod

F which is identical with the rod 39. This upper rod F has a threaded part 32a which is identical with the threaded extension 39a. As in the lower half of the unit, the upper threaded part 32a terminates at the top of the enlargement 22a which corresponds to the enlargement 22. Corresponding to the extension 39b, said upper rod has an extension 32 which extends through the bottom recess 23a which corresponds to the recess 23. This extension 32 is connected by a coupling collar 33 and fastening members 33a, to the rod 36 which is fixed to an upper extension of the coupling collar 42 by means of transverse pins Fa.

A liquid-tight assembly is provided by one or more packing rings which are tightened by packing nut 51. The packing ring or rings 50 are located in the lower passage 25 and the packing nut 51 engages the internal thread of the passage 24.

Since there is no passage of liquid through the upper part of the assembly of Fig. 3, these packing members are omitted from the upper part of Fig. 3. The pin 26a locks the sleeve 30 relative to sleeve 28, when the proper adjustment has been made. Pin 26a is located in bore 27a and recess 27. This pin is omitted in the lower half of Fig. 3.

The lower end of the lower body 20 is provided with an external thread 82 which is engaged by a gasket 38 by means of a nut 37. This nut 37 serves as an adaptor. This nut 37 has an external thread 37a which engages the internal thread of the cylindrical guide 49.

A resilient connection is thus provided by torsion control spring 15, between the tip 44 and the lower extension 39b of the rod 39. This spring 15 normally pushes the assembled rods F and 39 upwardly, so that the shuttles are normally in maximum pumping position for maximum output. When the extension 39b is moved downwardly to regulate the output of the metering pump, the control spring 15 provides a resilient connection with the plunger 46, so that the plunger 46 moves downwardly in unison with the extension 39b in order to diminish the offset of pin 9a and thus to diminish the output. The upper body 19 is fixed by means of screws Sa to a rigidly fixed plate 85 of the casing or panel of the entire system.

As the member 46 is downwardly vertically adjusted manually, it vertically adjusts the pin 10 which is in the bore 48, thus turnably adjusting the lever 9 and adjusting the position of the pin 9a in the oversized and eccentric hole H. This adjusts the shuttle S so that it now is turnable about an axis which is offset by a selected dimished distance relative to the axis of the shaft 2. The volume of liquid delivered by the respective metering pump is thus regulated.

In the present improved system, the control for each metering pump as modified according to my invention, is a delicate manual micro-adjustment and the only outlet of a metering pump for the liquid is the outlet port 18 of the casing 1, with no control of the setting of the plunger 46 of the modified metering pump by the pressure of the liquid within the casing 1. Each unit includes an ordinary unmodified Yale & Towne booster pump 59 which has the well-known automatic pressure control previously described. This booster pump 59 has an outlet 61a which is connected to the inlet of one of the microadjustable metering pumps P. Each micro-adjustable metering pump P has its own respective booster pump. One motor 56 drives all the metering micro-pumps P and another motor, not shown, drives all of the booster pumps 59.

The motor 56, which drives all the metering pumps P, has a shaft 67 which has a sprocket 68, which is connected to shaft 51a by chain 50b. This shaft 51a is connected to each metering pump P by a respective sprocket and chain drive which includes a chain 52. The rotor shaft of each metering pump has a sprocket 70 in mesh with the respective chain 52.

The motor (not shown) which operates the booster pumps 59, rotates a shaft 83 which extends through casing 59a.

The large booster pumps are driven directly from shaft 83 by respective chain and sprocket drives, which include chains 61.

The shaft 70a is actuated by shaft 83, as by a chain and sprocket connection.

The shaft 70a operates one or more small booster pumps 59 which are adjacent shaft 70a.

The shaft 51a is connected to shaft 55a, which drives the small metering pumps P by means of sets of gears 56b and 56a.

The flanges 55 are connection flanges.

Figure 1:
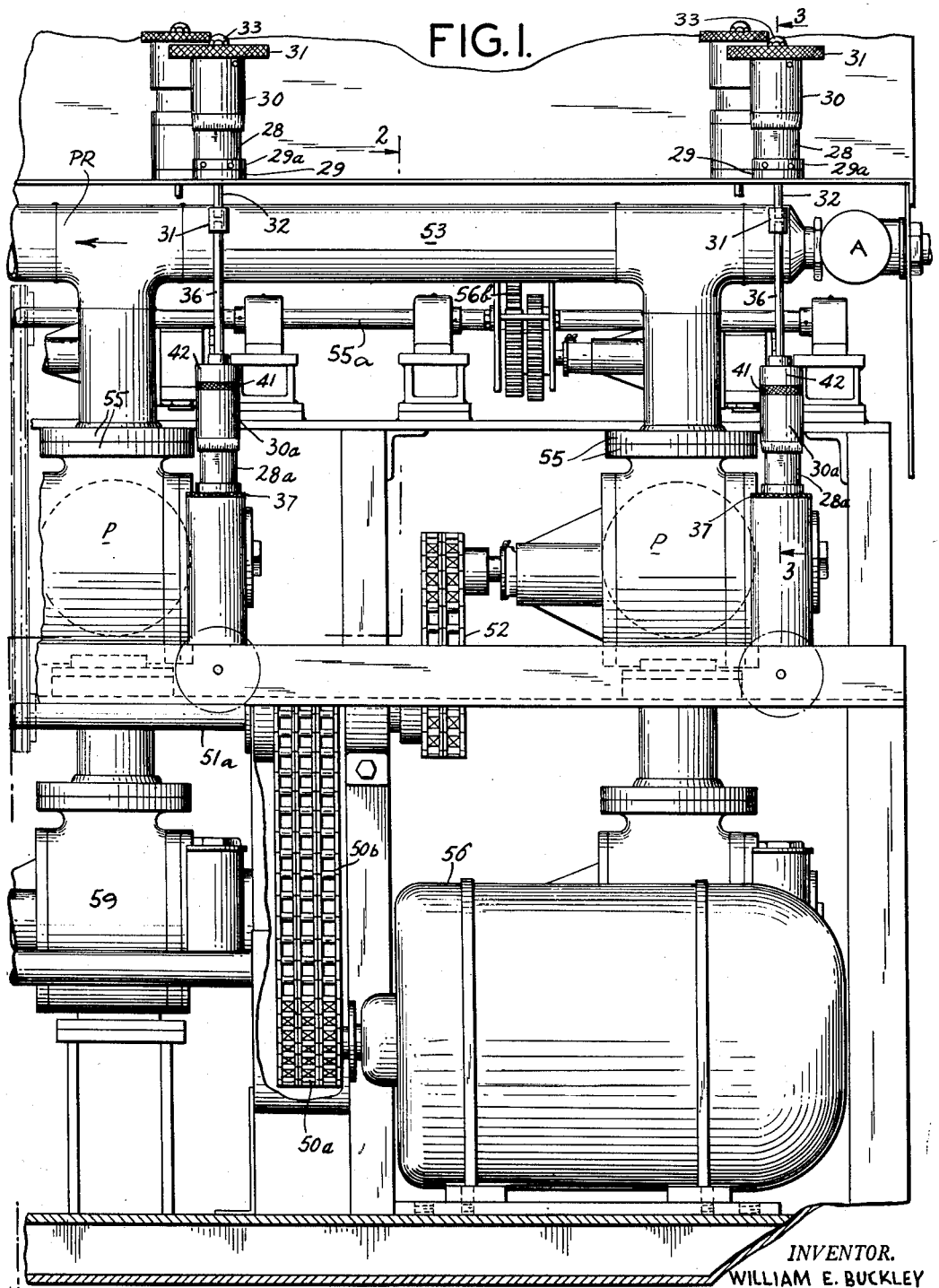
Fig. 1 is a front elevation of the entire assembled apparatus.
Figure 2:
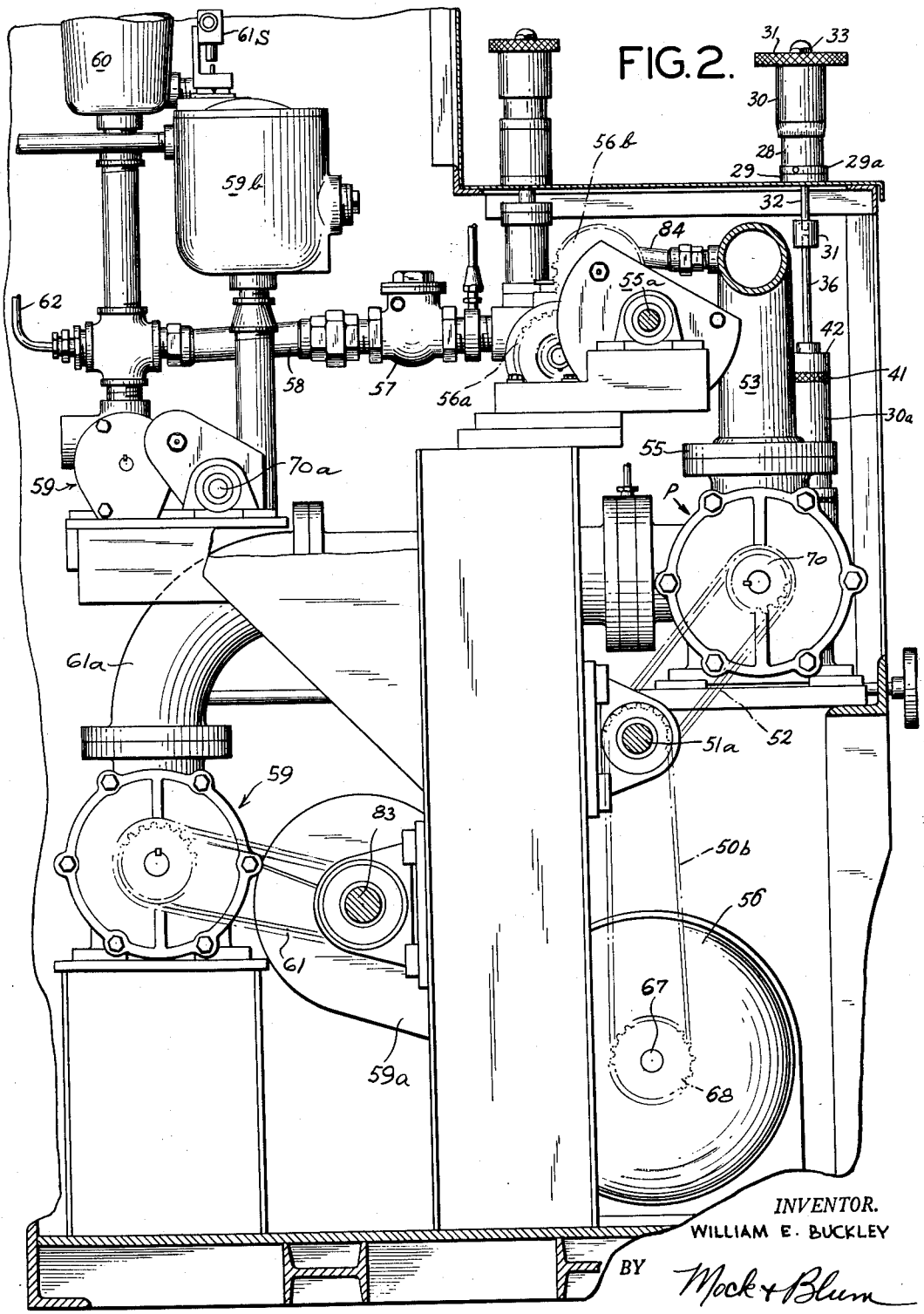
Fig. 2 is a section on the line 2—2 of Fig. 1.

An air eliminator 59b is connected to the discharge lines of the large booster pumps 59 in order to eliminate air from their liquid outputs, so that no air is fed by them to the metering micro-pumps P. This air eliminator 59b is conventional per se. There is also a common air eliminator 60 for the small booster pumps 59. The reference numeral 61s in Fig. 2 designates a known automatic control switch, whereby if the level of oil in the air eliminators 59b or 60 falls below the selected level, the power is automatically shut off by said switch 61s from all of the metering pumps P, thus stopping the operation of the metering pumps while the booster pumps continue to operate until the objectionable air has been expelled. The reference numeral 62 indicates one end of a thermometer device. The pipe 58 is a discharge pipe of one of the small booster pumps 59 and the check valve 57 merely prevents any return flow of liquid. 84 is an outlet of one of the small metering micro-pumps P which discharges into the common outlet manifold 53 of all the micro-pumps P.

As previously noted, each micro-pump P has its own booster pump 59 and each micro-pump P has a sensitive and manually operated micro-control for regulating the rate of flow of liquid through the respective pump P. At the outlet end of the common outlet manifold 53, and anterior a homogenizer into which the metered supplies of liquid are fed and in which the metered supplies of liquid are homogenized, there is a standard back pressure regulator PR which imposes a constant selected back pressure at the outlet end of the common outlet manifold 53 and also within the outlet manifold 53. This selected constant back pressure is therefore also applied at the outlet end of each micro-pump P. The pressure at the inlet end of each micro-pump P is kept exactly the same or as close as possible to the pressure at the outlet end of each micro-pump P, so that the micro-pumps P are not actuated by the liquid which passes through them. This eliminates the inaccuracies of the usual meter in which there is a pressure head between the inlet end and outlet end, so that liquid can leak through such pump and the amount of liquid which passes through the meter is necessarily affected by this pressure head. By operating the micro-pumps P at a constant selected velocity by means of selected motor or motors and adjusting or calibrating their output, this inaccuracy is prevented. In starting the system, the back pressure in the outlet manifold 53 which is common to all of the micro-pumps P is selected.

This constant back-pressure, as one example, may be in a range of 20–25 pounds per square inch. The output of each booster pump 59 is then adjusted by hand, using the standard automatic pressure control on each said booster pump until the constant outlet pressure of each booster pump 59 is substantially or exactly equal to the constant back pressure in the common manifold 53 as determined by the back pressure valve PR, which is similar to a relief valve.

If a unit is to be connected to a different supply of liquid, the direction of rotation of shaft 83 is reversed, so that the booster pumps 59 remove all liquid, beginning from the locations of the check valves 57, but not beyond check valves 57.

The operation of the booster pumps 59 is then stopped. The metering pumps P are operated until they are empty. The operation of the metering pumps P is then stopped.

The back pressure regulator valve PR is then opened. The homogenizer is under reduced pressure. By opening air inlet valve A, air is drawn through the common manifold 53 into the homogenizer, thus draining all liquid in the manifold 53 to the homogenizer.

The back pressure valve PR is then adjusted and air inlet valve A is closed, and the system is started with the changed supply or supplies of liquid.

In general, I deliver a fluid, which may be a gas or vapor or liquid, at a selected rate from a regulating zone which has an inlet and outlet. The booster pump or other means exerts a supply force which supplies the fluid to the inlet of the regulating zone at a substantially constant inlet pressure. The fluid is fed through said regulating zone by a mechanical feeding force which is applied in said regulating zone. As one example, this feeding force is supplied by the rotor and associated parts of the metering pump. This feeding force is distinct from the supply force, even if the booster pump and metering pump are operated in unison from the same motor. The feeding force optionally and preferably operates in a succession of feeding strokes, and the respective volumes of fluid which correspond to the respective feeding strokes are regulated. The method optionally and preferably uses feeding strokes of constant frequency, so that the rate of delivery of the fluid is regulated by regulating the amplitude of the feeding strokes or the volume delivered at each feeding stroke. The mechanical feeding force is independent of pressure in the fluid, because equal or substantially equal and constant pressures are maintained at the inlet and outlet of the regulating zone.

I have described a preferred embodiment of my invention, but numerous changes and omissions and additions and substitutions can be made without departing from its scope.

I claim:

1. A system for supplying streams of fluids in selected proportion to a mixing chamber, comprising a supply unit for each stream, each unit comprising a booster pump and a metering pump, each said pump having an inlet end and an outlet end, the outlet ends of said metering pumps being connected to said mixing chamber through respective input lines, the outlet end of each booster pump being connected through a respective discharge line to the inlet end of the metering pump of the respective unit, motor means for operating said booster pumps and said metering pumps, said motor means operating each booster pump at a velocity at which said booster pump would deliver fluid in the absence of the respective metering pump at an excess rate which exceeds the rate at which the fluid passes through the respective metering pump at the velocity at which the respective metering pump is operated by said motor means, each said booster pump being adapted to be regulated to adjust its output while said booster pump is operated at constant speed, each said booster pump having a pressure-controlled device which is controlled by the pressure in the respective discharge line to automatically adjust the output of said booster pump so as to maintain a substantially constant discharge-line pressure in the respective discharge line, said pressure-controlled devices being set to maintain substantially equal discharge-line pressures in the respective discharge lines, said mixing chamber having back-pressure means which exert a back pressure upon the mixed streams of fluid only in said mixing chamber and said input lines, said back-pressure means being set to apply a back-pressure which is substantially equal to said discharge-line pressures.

2. A system according to claim 1 in which said motor means have a source of power other than said streams.

3. In combination, a booster pump and a metering pump, each said pump having an inlet and an outlet, said booster pump being adjustable to vary its output while operating said booster pump at constant velocity, the outlet of said booster pump being connected by a discharge line to the inlet of said metering pump, said booster pump having automatic regulating means which are operated by the pressure in said discharge line to regulate the output of said booster pump while said booster pump is operated at constant velocity in order to apply a selected constant inlet pressure in said discharge line to the inlet of said metering pump, said metering pump being operated at constant velocity by a separate respective force which is independent of pressure exerted on said liquid anterior said metering pump to feed the liquid which is supplied thereto at a velocity which is less than the velocity of said liquid if it flow freely under said inlet pressure, back-pressure means connected to the outlet end of said metering pump and exerting a back pressure which is substantially constant and substantially equal to said inlet pressure, said back pressure and said inlet pressure being balanced only through said metering pump.

4. A combination according to claim 3 in which said discharge line has a check-valve, an outlet line which has a port intermediate its ends, the outlet of said metering pump being connected to said port, one end of said outlet line having a controlled air-inlet valve, the other end of said outlet line being connected to a source of reduced pressure, said booster pump being reversible.

5. A method of forwardly flowing a liquid through a metering zone which has an inlet and an outlet to enter a succeeding zone through said outlet, which consists in forcing said liquid in the form of separate and equal input masses towards said inlet of said metering zone at a constant input rate which is determined solely by the respective equal volumes of said input masses and by the number of said input masses which are forced per minute towards said inlet, each input mass being separately forced towards said inlet by an input impelling force which is separately and directly applied to each separated input mass, flowing said liquid in and through said metering zone towards said outlet of said metering zone in the form of separated and equal metering masses at a constant metering rate which is determined solely by the equal respective volumes of said metering masses and the number of said metering masses which are forced per minute towards said outlet of said metering zone, each metering mass being forced towards said outlet of said metering zone by a force which is separately and directly applied to each separated metering mass, thus flowing said liquid through said metering zone at a metering rate which is less than said input rate, creating a constant inlet pressure-head at said inlet of said metering zone by the difference between said input rate and said metering rate, and applying a constant back-pressure at said outlet of said metering zone which is substantially equal to said constant inlet-pressure head to flow said liquid through said metering zone substantially solely by said force which is applied in said metering zone, the force which is applied in the metering zone being wholly independent of the kinetic energy of the liquid and being also independent of any pressure which is exerted on the liquid anterior the metering zone.

6. A method of forwardly flowing a liquid through a metering zone which has an inlet and an outlet to enter a succeeding zone through said outlet, which consists in forcing said liquid towards said inlet under a selected and constant input force under which said liquid would flow at a selected and constant free input rate if said liquid flowed freely under said constant input force, flowing said liquid in said metering zone towards said outlet at a selected and constant metering rate which is less than said free input rate, creating a constant inlet pressure-head at said inlet by the difference between said free input rate and said metering rate, and applying a constant back-pressure to said liquid at said outlet end which is substantially equal to said inlet pressure-head, and applying a propelling force to said liquid in said metering zone to flow it towards and out of said outlet end, said propelling force being independent of the kinetic energy of the liquid and being also independent of said input force and being also independent of any pressure which is exerted on said liquid anterior said metering zone.

References Cited in the file of this patent

UNITED STATES PATENTS

| | | |
|---|---|---|
| 2,009,622 | Kennedy | July 30, 1935 |
| 2,024,478 | Short | Dec. 17, 1935 |
| 2,195,005 | Grosvenor et al. | Mar. 26, 1940 |
| 2,247,922 | Potter | July 1, 1941 |
| 2,262,031 | Meyer | Nov. 11, 1941 |
| 2,348,679 | Groves | May 9, 1944 |
| 2,564,306 | Isrelli et al. | Aug. 14, 1951 |